United States Patent
Tseng

(10) Patent No.: US 9,823,803 B2
(45) Date of Patent: Nov. 21, 2017

(54) MODULAR USER PROFILE OVERLAY

(75) Inventor: Erick Tseng, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 275 days.

(21) Appl. No.: 12/976,791

(22) Filed: Dec. 22, 2010

(65) Prior Publication Data

US 2012/0166964 A1 Jun. 28, 2012

(51) Int. Cl.
| | |
|---|---|
| *G06F 3/048* | (2013.01) |
| *G06Q 10/10* | (2012.01) |
| *G06F 9/44* | (2006.01) |
| *G06F 9/445* | (2006.01) |

(52) U.S. Cl.
CPC ............ *G06F 3/048* (2013.01); *G06F 9/4443* (2013.01); *G06F 9/4451* (2013.01); *G06Q 10/10* (2013.01); *G06F 2203/04803* (2013.01)

(58) Field of Classification Search
CPC ........... G06F 2203/04803; G06F 3/048; G06F 9/4443; G06F 9/4451; G06Q 10/10
USPC ......................................................... 715/745
See application file for complete search history.

(56) References Cited

U.S. PATENT DOCUMENTS

| | | | | |
|---|---|---|---|---|
| 7,167,910 | B2* | 1/2007 | Farnham et al. | 709/223 |
| 7,680,882 | B2* | 3/2010 | Tiu et al. | 709/203 |
| 8,032,508 | B2* | 10/2011 | Martinez et al. | 707/708 |
| 8,060,405 | B1* | 11/2011 | Lawrence | 705/14.54 |
| 8,060,827 | B2* | 11/2011 | Fischer et al. | 715/745 |
| 8,135,800 | B1* | 3/2012 | Walsh et al. | 709/217 |
| 8,296,660 | B2* | 10/2012 | Macadaan et al. | 715/751 |
| 8,392,271 | B2* | 3/2013 | Ho et al. | 705/26.1 |
| 8,521,824 | B2* | 8/2013 | Baransky et al. | 709/206 |
| 2005/0160094 | A1* | 7/2005 | Morgenstern et al. | 707/9 |
| 2005/0165785 | A1* | 7/2005 | Malkin et al. | 707/10 |
| 2006/0080613 | A1 | 4/2006 | Savant | |
| 2006/0270419 | A1* | 11/2006 | Crowley et al. | 455/456.2 |
| 2007/0073756 | A1* | 3/2007 | Manhas et al. | 707/101 |
| 2007/0106627 | A1* | 5/2007 | Srivastava et al. | 706/20 |
| 2007/0162862 | A1* | 7/2007 | Ogasawara et al. | 715/751 |
| 2007/0168533 | A1* | 7/2007 | Canright et al. | 709/230 |
| 2007/0214141 | A1* | 9/2007 | Sittig et al. | 707/7 |
| 2007/0255807 | A1* | 11/2007 | Hayashi et al. | 709/219 |
| 2007/0265993 | A1* | 11/2007 | Knight et al. | 707/1 |
| 2008/0040475 | A1* | 2/2008 | Bosworth et al. | 709/224 |
| 2008/0040673 | A1* | 2/2008 | Zuckerberg et al. | 715/745 |
| 2008/0104225 | A1* | 5/2008 | Zhang et al. | 709/224 |
| 2008/0134035 | A1* | 6/2008 | Pennington et al. | 715/713 |
| 2008/0134040 | A1* | 6/2008 | Pennington et al. | 715/733 |
| 2008/0209343 | A1* | 8/2008 | Macadaan et al. | 715/747 |
| 2008/0209350 | A1* | 8/2008 | Sobotka et al. | 715/762 |
| 2008/0242277 | A1* | 10/2008 | Chen et al. | 455/414.2 |

(Continued)

OTHER PUBLICATIONS

Collier, Marsha. Facebook and Twitter for Seniors for Dummies (first edition). Published by Wiley. Sep. 7, 2010. ISBN 978-0-470-63754-8.eBook download available at [http://it-ebooks.info/book/2235/].*

(Continued)

*Primary Examiner* — Amy M Levy
(74) *Attorney, Agent, or Firm* — Baker Botts L.L.P.

(57) ABSTRACT

In one embodiment, a social networking system receives a selection of a user in a first user interface, accesses one or more data stores for the user's user profile information, constructs a frame containing the user's user profile information, and displays the frame overlaying the first user interface.

16 Claims, 11 Drawing Sheets

(56) References Cited

U.S. PATENT DOCUMENTS

| | | | |
|---|---|---|---|
| 2008/0244414 A1* | 10/2008 | Marcoullier et al. | 715/738 |
| 2009/0031301 A1* | 1/2009 | D'Angelo et al. | 717/178 |
| 2009/0070412 A1* | 3/2009 | D'Angelo | G06Q 10/10 709/203 |
| 2009/0157618 A1 | 6/2009 | Matheny | |
| 2009/0171968 A1* | 7/2009 | Kane et al. | 707/10 |
| 2009/0172746 A1* | 7/2009 | Aldrey et al. | 725/61 |
| 2009/0325556 A1* | 12/2009 | Lee et al. | 455/414.2 |
| 2010/0017431 A1* | 1/2010 | Schmidt et al. | 707/102 |
| 2010/0037148 A1* | 2/2010 | Harper | G06Q 10/10 715/752 |
| 2010/0125604 A1* | 5/2010 | Martinez et al. | 707/784 |
| 2010/0229149 A1* | 9/2010 | Gella et al. | 717/101 |
| 2010/0262928 A1* | 10/2010 | Abbott | 715/769 |
| 2010/0268830 A1* | 10/2010 | McKee et al. | 709/228 |
| 2010/0280860 A1* | 11/2010 | Iskold et al. | 705/7 |
| 2010/0306249 A1* | 12/2010 | Hill et al. | 707/769 |
| 2010/0317370 A1* | 12/2010 | Feng et al. | 455/456.3 |
| 2011/0047463 A1* | 2/2011 | Shepherd et al. | 715/723 |
| 2011/0078188 A1* | 3/2011 | Li et al. | 707/776 |
| 2011/0106896 A1* | 5/2011 | Baransky et al. | 709/206 |
| 2011/0125844 A1* | 5/2011 | Collier et al. | 709/204 |
| 2011/0145160 A1* | 6/2011 | Hajiaghayi et al. | 705/319 |
| 2011/0208814 A1* | 8/2011 | Bostrom et al. | 709/204 |
| 2011/0252344 A1* | 10/2011 | van Os | G06F 9/4443 715/763 |
| 2011/0270923 A1* | 11/2011 | Jones | G06F 3/0421 709/204 |
| 2011/0296312 A1 | 12/2011 | Boyer et al. | |
| 2012/0005224 A1* | 1/2012 | Ahrens et al. | 707/769 |
| 2012/0047129 A1* | 2/2012 | Redstone et al. | 707/723 |
| 2012/0110052 A1* | 5/2012 | Smarr | G06Q 10/10 709/201 |
| 2012/0159382 A1* | 6/2012 | Matthews et al. | 715/788 |

OTHER PUBLICATIONS

Snook, Jonathon. Content Overlay with CSS. Blog post. Mar. 26, 2008. retrieved from [http://snook.ca] on [May 12, 2014].*
Caching. IEEE 100 The Authoritative Dictionary of IEEE Standards Terms Seventh Edition. Dec. 2000. IEEE Press. p. 135.*

* cited by examiner

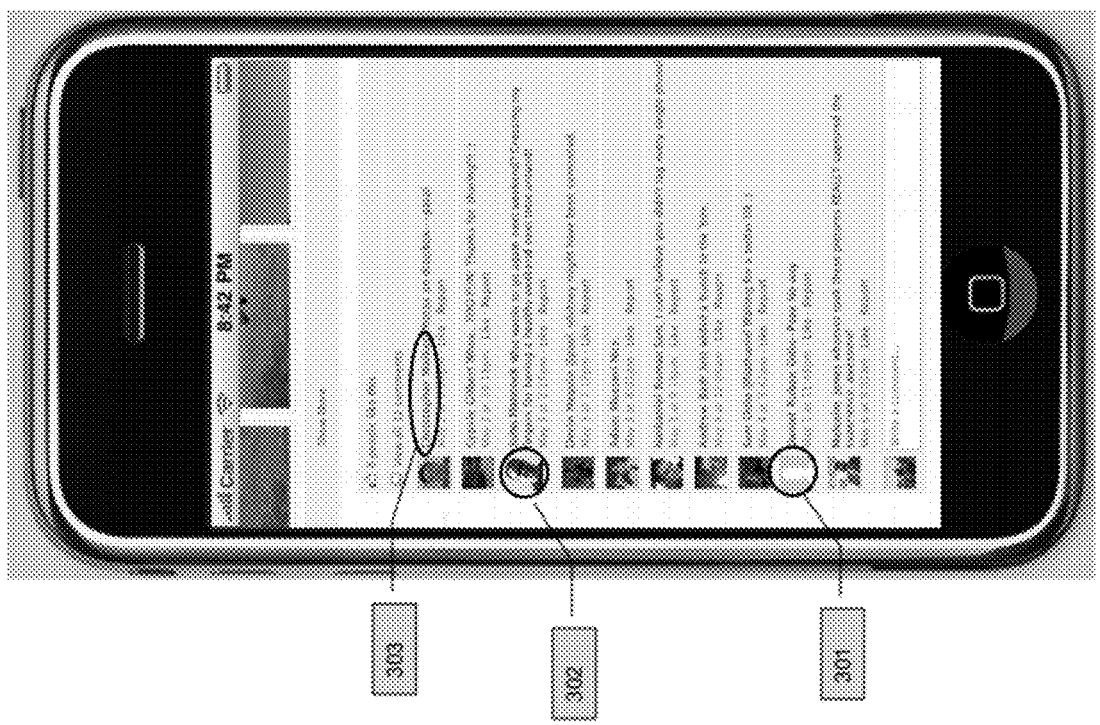

MODULAR USER PROFILE OVERLAY

TECHNICAL FIELD

The present disclosure relates generally to a social networking service and, more particularly, to displaying user profile information as an overlay in a computer user interface.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system.

SUMMARY

Particular embodiments relate to providing user profile modules as overlays to user interfaces generated by an application. In particular implementations, the present invention allows a user to easily view user profile information of other users from an application that is independent from a social networking or other system that hosts profile pages. These and other features, aspects, and advantages of the disclosure are described in more detail below in the detailed description and in conjunction with the following figures.

BRIEF DESCRIPTION OF THE DRAWINGS

FIG. 3 illustrates an example user interface of wall posts of a social networking system.

DETAILED DESCRIPTION

Figure 1:
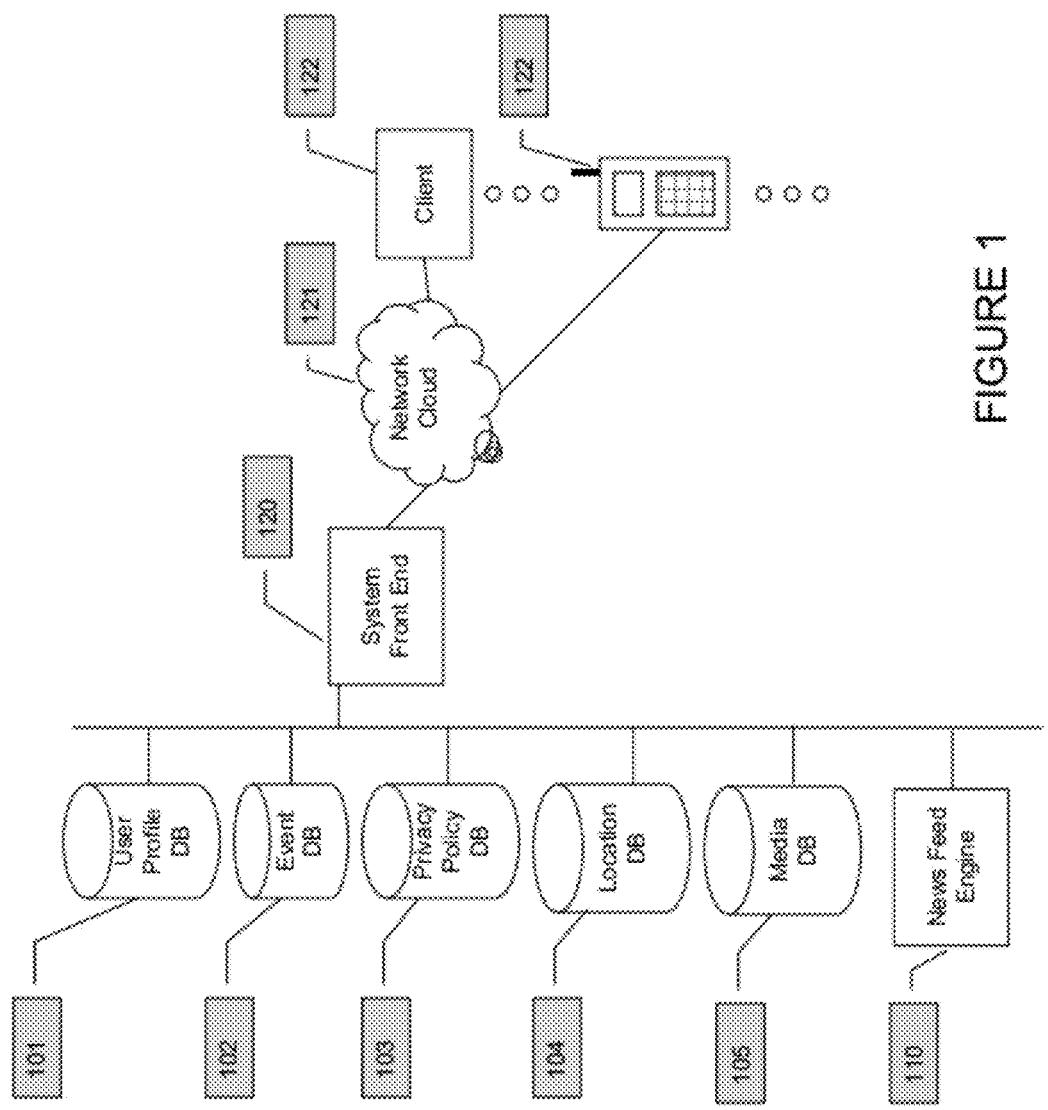
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

Additionally, social networking system may provide various communication channels for users to interact with each other. In addition, other communications channels not intermediated or facilitated by the social networking system also allow users to interact. Thus, users of a social networking system may interact with each other by sending and receiving content items of various types of media through the communication channels. In particular embodiments, communication channels may include, but are not limited to, email, instant messaging (IM), text, voice or video chat, and wall posts. A user of the social networking system may also interact through various communication channels outside the social networking system with another person (a user or non-user of the social networking system). Examples of those communication channels are phone call though public switched telephone network (PSTN) or the Internet (e.g., VoIP or voice over internet protocol), text, voice or video chat, SMS (short message service) text messaging, instant messaging, and email. To keep track of communication channel information, a user of the social networking system may keep one or more address books. An address book may contain one or more contacts (e.g., a person or a business identify) and for each contact, a name and communication channel information for the contact (e.g., a phone number, a user ID for an IM service, an email address, a user ID for a social networking system, home address, etc.). A user of the social networking system may keep the one or more address books inside or outside the social networking system. For example, the social networking system may maintain an address book for a user, and the user can access the address book though the social networking system's web site, or through a client application hosted by a client device 122. For example, a user may keep an address book in connection with a client application hosted locally by the user's personal computer (e.g., Microsoft Outlook), or keep an address book in a native address book application supported by the user's mobile phone. For example, a user may keep an address book hosted over the Internet by a remote server (i.e., the address book is hosted "in the cloud") and access the address book via a web browser on a client device 122. In other implementations, an address book database may be synchronized between the client device 122 and the social network system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105.

In particular embodiments, user profile database 101 may store communication channel information and an address book of a user. The address book, in one implementation, may be a superset or a subset of the users of the social networking system that a user has established a friend or contact relationship. A user of client device 122 may access this address book information using a special purpose or general purpose client application to view contact information. In particular embodiments, the address book may contain one or more contacts (e.g. a person or an business entity), and a name (e.g., first name, and/or last name) and communication channel information for each contact (e.g., a phone number, a user ID for an IM service, an email address, a user ID for a social networking system, home address, etc.). For at least a portion of the address book information, the contact entries may be dynamic in that the contact entry is associated with a user of the social networking system that maintains his or her own account and corresponding user profile with contact information. Accordingly, when a first user changes any aspect of contact information, the revised contact information may be provided to requesting users. In particular embodiments, a user may access the address book, look up and connect to a contact through a communication channel.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. In particular embodiments, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, location database 104 may store a user's check-in activities. For example, a user can create a place (e.g., a new restaurant or coffee shop) and the social networking system can store the created place in location database 104. For example, location database 104 can store a user's search activity.

In particular embodiments, news feed engine 110 may access user profile database 101, event database 102, location database 104 and media database 105 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, location database 104 and media database 105 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

A first user using a client application that displays graphical representations of other users (e.g., pictures, avatars, etc.)—for example, an address book, a IM chat application, and the like—may desire to quickly view status or related current information about the users without having to switch to a browser application or a special-purpose application. Furthermore, with an abundance of information available for each user in the social networking system, and often limited size of a computer user interface (e.g., a screen of a mobile phone), it may be desirable to display a user's information in a compact, organized, and easily accessible format. Particular embodiments herein describe methods of receiving a selection of a user in connection with a first user interface of a client application, accessing a remote store of user profile information, and displaying the selected user's information in a modular, expandable, and selectable frame overlaying the first user interface of the client application.

Figure 2:
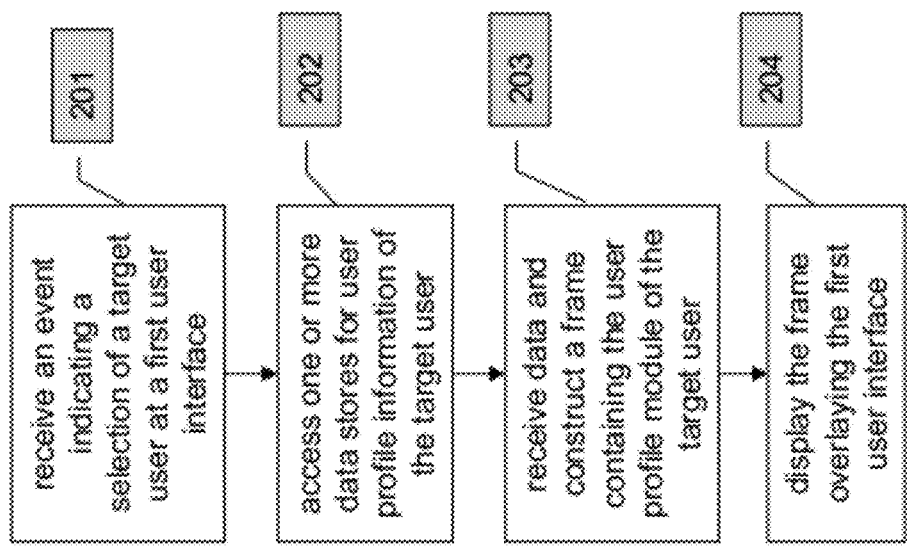
FIG. 2 illustrates an example method of generating a user profile overlay.
Figure 3A:
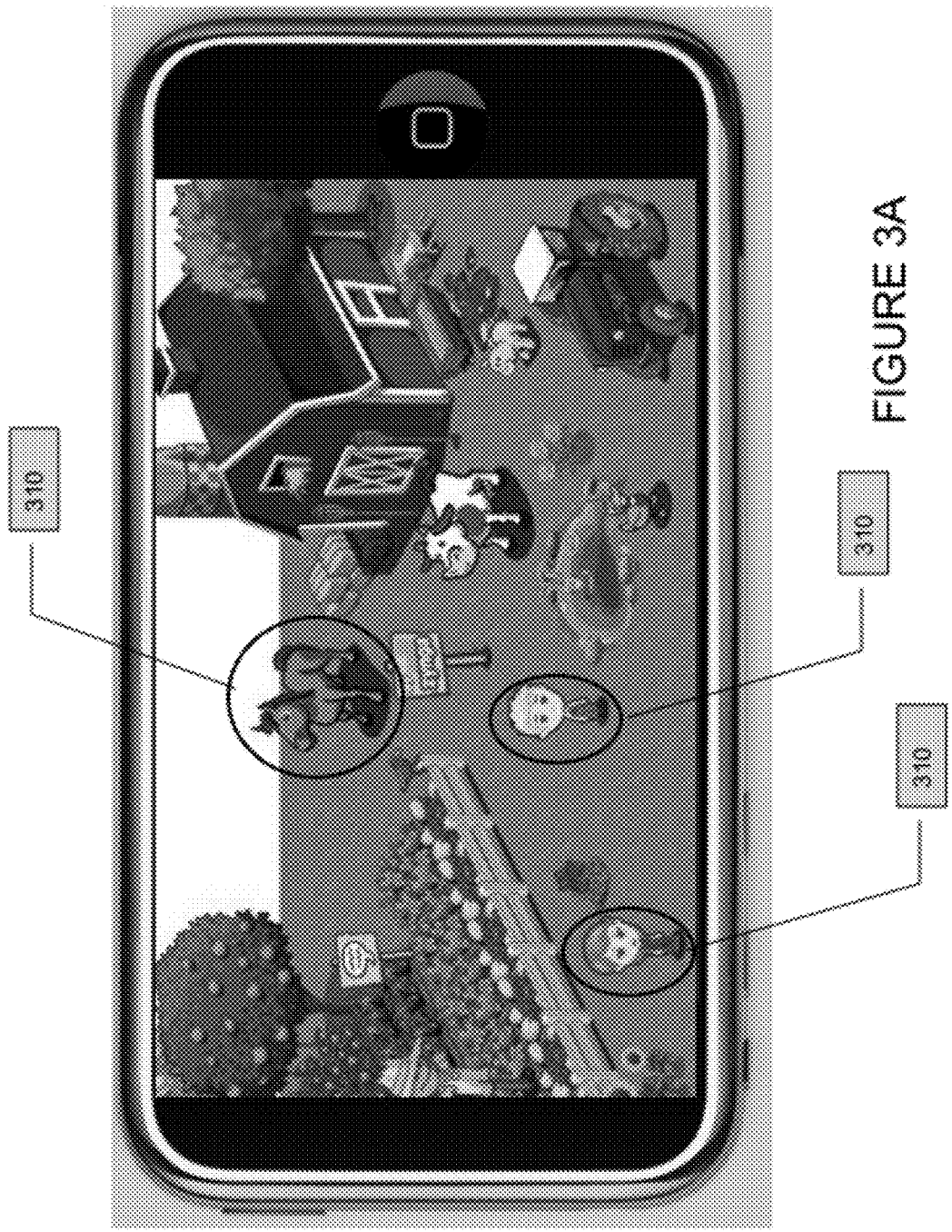
FIG. 3A illustrated an example user interface of a computer game.

FIG. 2 illustrates an example method of generating a user profile overlay. FIG. 2 can be implemented by a user profile rendering process hosted by client device, such as mobile device 122, that accesses social networking system to generate the profile. In particular embodiments, the user profile rendering process may receive an event associated with a selection by an initiating user of a target user in a first user interface associated with a first application hosted on the initiating user's client device 122 (201). In particular embodiments, the initiating user may select the target user by selecting a unique identifier of the target user in the first user interface. For example, a unique identifier of the target user can be a user/screen name, or head shot, a graphic icon, an email address, or a phone number displayed in a user interface of an application. FIG. 3 illustrates an example of a wall-post of a social networking system. For example, a user can view and add comments to a wall-post in a web-browser or a client application hosted by the user's mobile phone as shown in FIG. 3. In FIG. 3, a graphic icon (301), a photographic picture or a profile picture (302), and a text string or user/screen name (303) are examples of unique identifiers in a user interface of a client application (or a web page) of a social networking system. FIG. 3A illustrates an example user interface of a computer game. In FIG. 3A, graphic icons or avatars (310) may correspond to various users and are additional examples of unique identifiers in a user interface of a computer-implemented game. The inputs that cause a selection of a unique identifier can vary depending on engineering or user interface design choice. For example, an initiating user may select a unique identifier by double-clicking or double-tapping the unique identifier. In other implementations, a right click may select a unique identifier. With touch pad or multi-touch displays, a unique identifier may be selected by touching the unique identifier and holding the position down for a threshold period of time. In other implementations, the unique identifier may be selected and dragged to a special region or hot corner of the display. Other events that may initiate the user profile rendering process may include mouse-over events.

In particular embodiments, the user profile rendering process may access the social networking system for user profile information of the target user (302). In one implementation, the user profile rendering process receives user identifying information (e.g., a user identifier, an email address, a phone number, a user ID of a chat service, etc.) in a function call made by the first application. The user profile rendering process may pass this information to the social networking system to resolve the user identifying information into a user identifier in the social network. The social networking system may then access one or more data stores of the social networking system for information relating to the target user, including user profile information, posts, events and other activities. In particular embodiments, user profile information of a user may comprise a name, a profile picture, location data, a news feed, media data (e.g., photos, video clips), and communication channel information of the user. For example, the social networking system can access user profile database 101 for a name and a profile picture of the target user. In particular embodiments, the social networking system may access location database 104 for location data of the target user (e.g., a recent check-in to a place, or GPS coordinates). In particular embodiments, the social networking system may access media database 105 for media data for the target user (e.g., a picture or video clip that the target user recently uploaded to the social networking system, a photo that the target user was tagged in, a photo that the target user recently commented on, etc.). In particular embodiments, the social networking system may access user profile database 101 for communication channel information of the target user (e.g., a phone number, an email address). In particular embodiments, the user profile rendering process may cause news feed engine 110 to access user profile database 101, event database 102, privacy policy database 103, location database 104, and media database 105 to compile a news feed about the target user. In particular embodiments, the user profile information of the target user may comprise only the target user's user profile information that are accessible to the initiating user based on one or more privacy setting by the target user.

In particular embodiments, the user profile rendering process may receive information from the social networking system and construct a frame containing a user profile module of the target user (303). In particular embodiments, the user profile rendering process may display the frame overlaying the first user interface (304) of the client application, from which the user initially selected the target user. In some implementations, the user profile rendering process can be implemented as part of a special-purpose client application hosted on a mobile or other client device, or as part of library bundled with the operating system of the mobile or other client device. The selection of a unique identifier of the target user in the first user interface of the first application can cause a call to the user profile rendering process (e.g., FBuserProfileQuery://facebook.com/php?targetuser=johnsmith) to access the one or more data stores of the social networking system and obtain the target user's user profile information in a structured document (e.g., in HTML or in JAVASCRIPT). The first application can display the structured document in a frame overlaying the first user interface. Alternatively, the user profile rendering process can display the structured document in a frame overlaying the first user interface of the first application.

Figure 4:
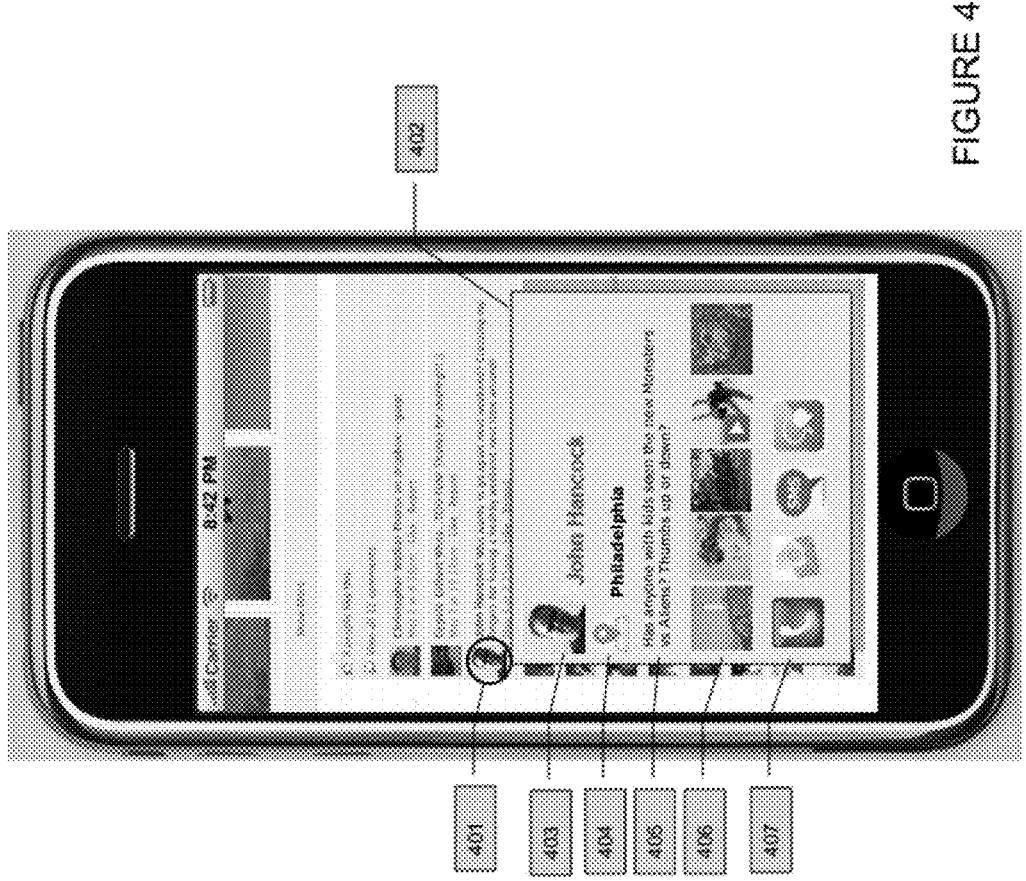
FIG. 4 illustrates an example frame containing user profile information.

In particular embodiments, the user profile rendering process may construct the frame such that it includes one or more panels. In particular embodiments, each panel of the one or more panels may contain one or more objects corresponding to a subset of the user profile information of the target user. FIG. 4 illustrates an example frame containing a user profile module. In the example of FIG. 4, an initiating user selects a target user by selecting a picture icon (401) of the target user, and the user profile rendering process can construct a frame (402) containing a user profile module including information of the target user. In particular embodiments, the frame may comprise a panel containing a profile picture and a name (e.g., "John Hancock") of the target user (403). In particular embodiments, the frame may comprise a panel containing location data (e.g., "Philadelphia") of the target user (404). In particular embodiments, the frame may comprise a panel containing a news feed (e.g., one or more news items) of the target user (405). In particular embodiments, the frame may comprise a panel containing media data (e.g., one or more photos, one or more still frames of one or more video clips) associated with the target user (406). In particular embodiments, the frame may comprise a panel containing communication channel information of the target user, wherein each of one or more communication channels may be represented by a graphic icon (407). In particular embodiments, the one or more objects in each of the one or more panels may be scrollable. For example, if there are more photos of the target user than a panel can display at one time, the initiating user can view additional photos by scrolling through the photos by a swiping motion by a finger or a curser, or by selecting an icon (e.g., a left arrow or a right arrow) indicating one or more photos are available.

Figure 4A:
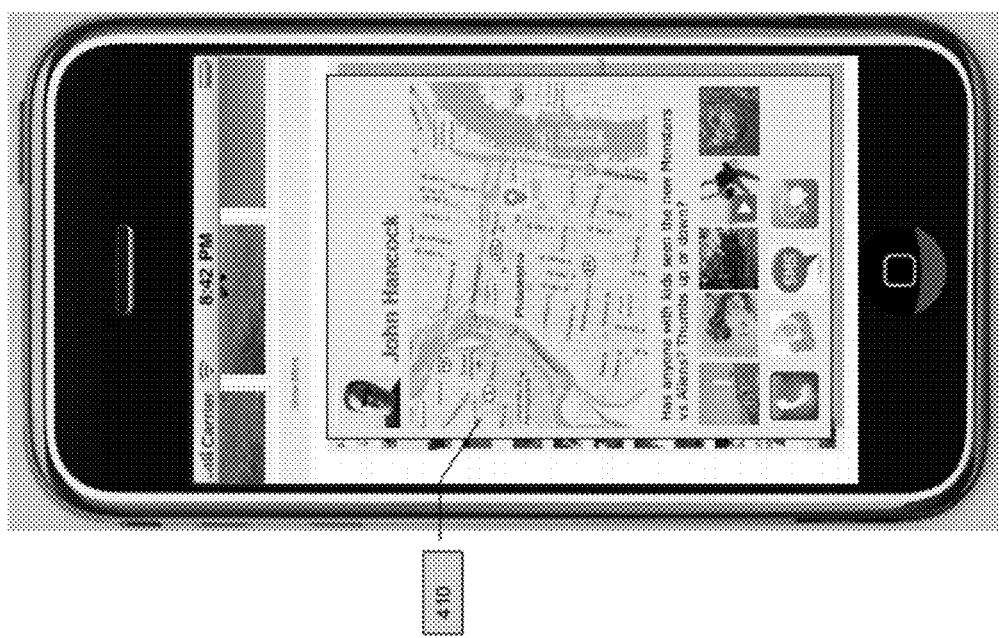
FIG. 4A illustrates an example of an expanded location data panel.
Figure 4B:
FIG. 4B illustrates an example of an expanded news feed panel.
Figure 4C:
FIG. 4C illustrate an example of an expanded media data panel.

In particular embodiments, the one or more objects in each of the one or more panels may be selectable. For example, an initiating user can select a graphic icon representing a particular communication channel of the target user, causing the user profile rendering process to initiate a connection to the target user by the particular communication channel. In particular embodiments, each of the one or more panels may be expandable. FIG. 4A illustrates an example of an expanded location data panel. For example, an initiating user can select location data by tapping on a text string "Philadelphia" in the location data panel (404), causing the user profile rendering process to expand the location data panel, and display a map (410) corresponding to the location data in the location data panel. FIG. 4B illustrates an example of an expanded news feed panel. For example, an initiating user can select a news item by tapping on a text string of a news item in the news feed panel (405), causing the user profile rendering process to expand the news feed panel, and display wall posts corresponding to the news item (411). FIG. 4C illustrate an example of an expanded media data panel. For example, an initiating user can select one of the one or more photos (or still frames of video clips) in the media data panel (406) by tapping on the photo, causing the user profile rendering process to expand the media data panel, and display the photo in larger size and/or in actual aspect ratio (412), or causing the user profile rendering process to play a selected video clip.

In particular embodiments, the user profile rendering process may access one or more data stores for user profile information of one or more users and store all or a subset of the user profile information of the one or more users in one or more computing devices. For example, the user profile rendering process can access location database 105 for location data of a user's address book contacts, store the contacts' user location data in the user's laptop computer for later use, and periodically update the stored location data for the address book contacts. For example, if a first user selects a photo of a second user in a web page hosted on the first user's mobile phone, causing the user profile rendering process to access one or more data stores for the second user's user profile information and construct a frame displaying a user profile module including user profile information of the second user overlaying the web page, the user profile rendering process can store ("cache") the second user's user profile information in the first user's mobile phone for later use.

Figure 5:
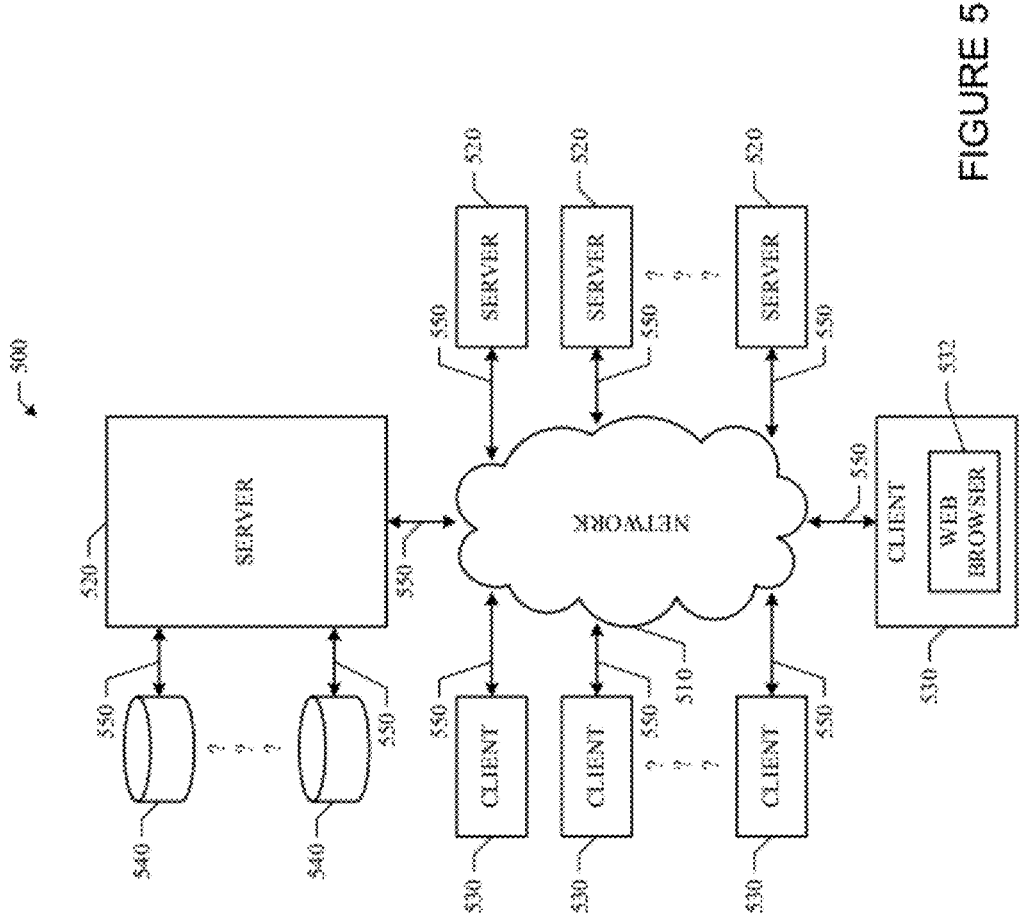
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
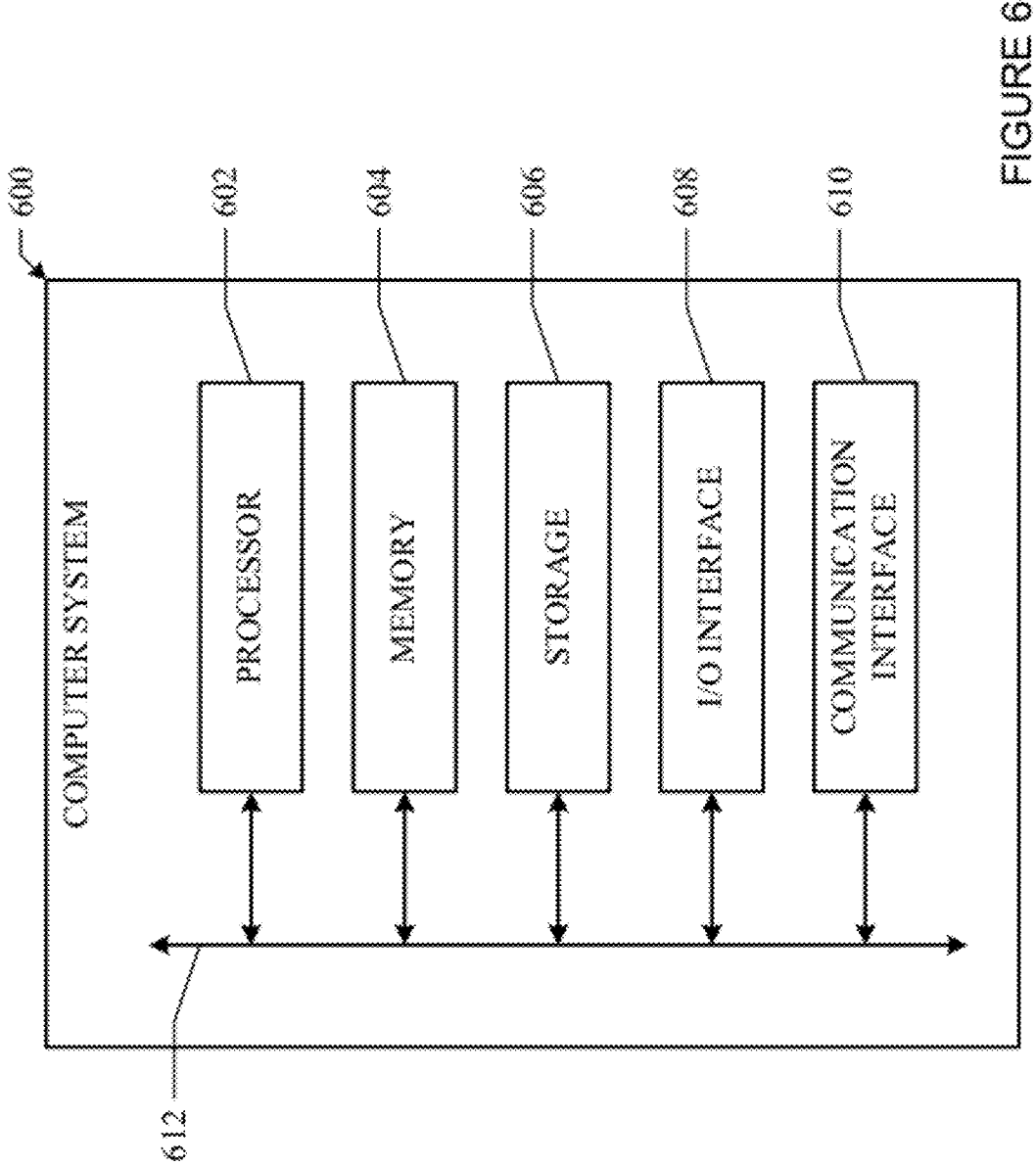
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
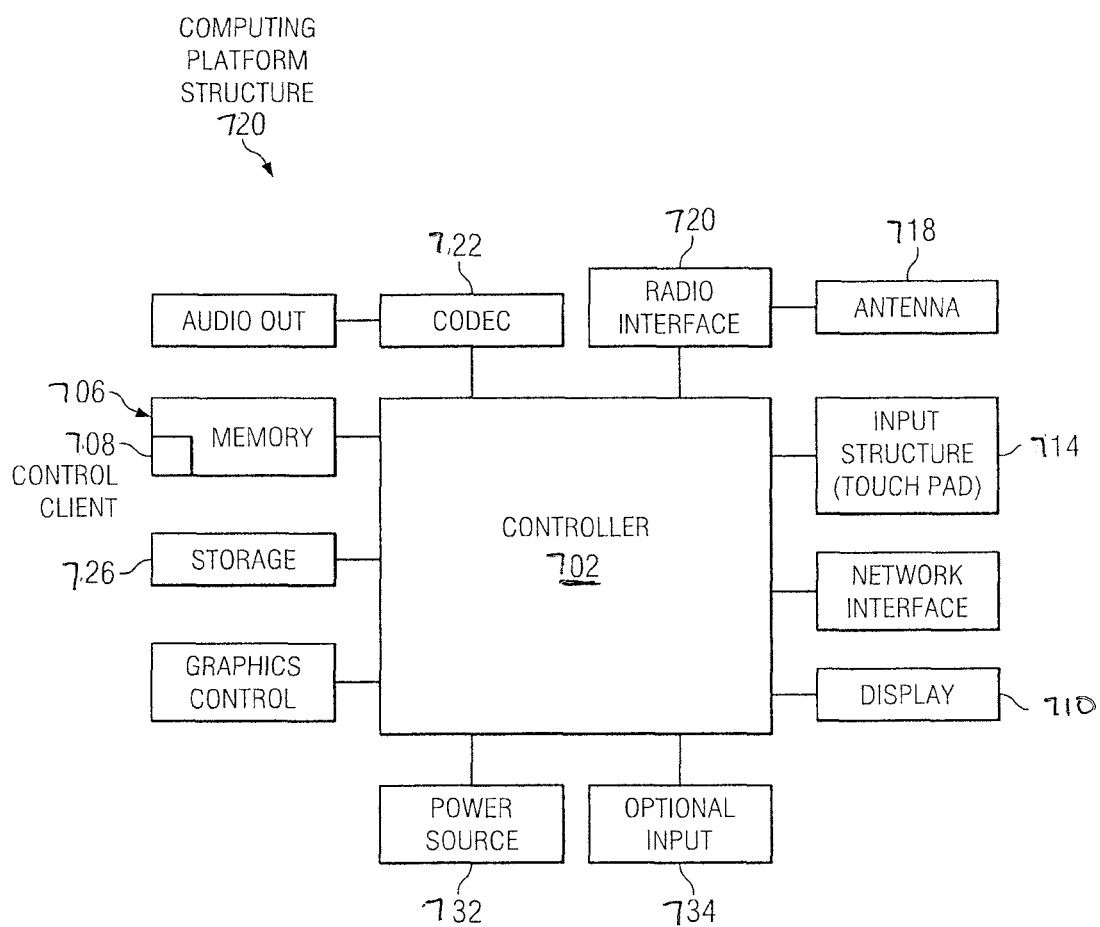
FIG. 7 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be WINDOWS-based, MACOS-based, or UNIX- or LINUX-based, or SYMBIAN-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touch-screen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Electric signals (e.g., analog) may be produced by microphone 710 and fed to earpiece 712. Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone 724 to codec 722 configured to process signals under control of controller 704. Additionally, multipoint sensing devices may be powered power source 732.

Mobile device may also include one or more user input devices 734 (other than input structure 714) that are operatively coupled to the controller 704. Generally, input devices 734 are configured to transfer data, commands and responses from the outside world into multipoint sensing devices. By way of example, mobile device may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:

displaying, in a first user interface of a first application at a client device, a representation of a target user, the target user corresponding to a node in a social graph associated with a social-networking system and a contact in an address book, wherein the address book is an application supported by the client device and the selection of the target user comprises a gesture dragging the representation of the target user to a region of the user interface;

receiving, at the client device, a selection of the target user;

accessing a remote data store for user-related information of the target user;

accessing one or more privacy policy databases for privacy settings of the target user;

determining whether the privacy settings allow the application to access to the user-related information of the target user;

when the privacy settings allow the application to access the user-related information of the target user, updating, in a storage associated with the address book, a stored location data for the contact with a location data of the target user;

determining that a first action and a second action are related actions of a news feed data associated with an activity related to a social graph of the target user by comparing one or more attributes of the second action with one or more attributes of the first action;

grouping the determined related actions of a news feed data associated with an activity related to a social graph of the target user;

displaying, in a second user interface of a second application at a client device, the user-related information in a frame as an overlay of the first user interface of the first application, the frame comprising a plurality of panels, wherein each of the panels includes a different subset of the user-related information, the plurality of panels comprising:

a first panel comprising a first selectable object corresponding to the location data of the target user, and wherein the location data comprises the target user's check-in activity; and a second panel comprising a second selectable object corresponding to the grouped related actions of the news feed data associated with the activity related to the social graph of the target user, the news feed data comprising a link enabling a viewing user to participate in the activity of the target user;

receiving, at the client device, a selection of the first selectable object; and in response to the selection, displaying an expanded location data panel corresponding to the selectable object.

2. The method of claim 1, wherein the expanded location data panel comprises a map corresponding to the location data of the target user.

3. The method of claim 1, wherein the plurality of panels further comprise:
   a panel containing a selectable object corresponding to a name and a profile picture of the target user;
   a panel containing a selectable object corresponding to media data of the target user; or
   a panel containing a selectable object corresponding to communication channel information of the target user.

4. The method of claim 1 wherein determining that a first action and a second action are related actions of a news feed data associated with an activity related to a social graph of the target user by comparing one or more attributes of the second action with one or more attributes of the first action comprises:
   computing a score for each second action in a plurality of second actions by comparing one or more attributes of each second action with one or more attributes of the first action;
   ranking the plurality of second actions according to the score computed for each second action;
   determining that a first action and a second action are related actions of a news feed data associated with an activity related to a social graph of the target user based on the ranking.

5. The method of claim 1, further comprising caching the user-related information of the target user.

6. The method of claim 1, further comprising:
   determining whether the viewing user belongs to a privacy group in the privacy settings of the target user; and
   wherein displaying the user-related information in a frame as an overlay on the user interface occurs when the viewing user belongs to the privacy group in the privacy settings of the target user.

7. The method of claim 1, further comprising:
   determining a privacy group in the privacy settings of the target user containing the viewing user; and
   determining an allowable subset of user-related information of the target user that is associated with the determined privacy group containing the viewing user, the allowable subset of user-related information of the target user comprises each of the different subsets of the user-related information.

8. The method of claim 7, wherein the privacy group comprises users that are a first-degree connection of the target user.

9. The method of claim 1, further comprising:
   determining a subset of the grouped related actions of the news feed data based on the privacy settings of the target user; and
   wherein the second panel further comprises the subset of the grouped related actions of the news feed data.

10. The method of claim 1, further wherein receiving a selection of a target user further comprises receiving a selection of a target user in the address book.

11. The method of claim 1, wherein the contact in the address book comprises a communication channel information that is dynamically maintained to correspond to a communication channel information associated with the node in the social graph.

12. The method of claim 1, wherein the selection of the target user further comprises double tapping the representation of the target user.

13. An apparatus, comprising:
   a memory;
   a display;
   a radio network interface;
   an interface device operative to generate signals responsive to user input;
   one or more processors;
   computer program code stored on a non-transitory medium comprising instructions operative to cause the one or more processors to:
      display, in a first user interface of a first application, a representation of a target user, the target user corresponding to a node in a social graph associated with a social-networking system and a contact in an address book, wherein the address book is an application supported by the client device and the selection of the target user comprises a gesture dragging the representation of the target user to a region of the user interface;
      receive a selection of the target user;
      access a remote data store for user-related information of the target user;
      access one or more privacy policy databases for privacy settings of the target user;
      determine whether the privacy settings allow the application to access the user-related information of the target user;
      when the privacy settings allow the application to access the user-related information of the target user, update, in the address book, a stored location data for the contact with a location data of the target user;
      determine that a first action and a second action are related actions of a news feed data associated with an activity related to a social graph of the target user by comparing one or more attributes of the second action with one or more attributes of the first action;
      group the determined related actions of a news feed data associated with an activity related to a social graph of the target user;
      display, in a second user interface of a second application, the user-related information in a frame as an overlay of the first user interface of the first application, the frame comprising a plurality of panels, wherein each of the panels includes a different subset of the user-related information, the plurality of panels comprising:
         a first panel comprising a first selectable object corresponding to the location data of the target user, and wherein the location data comprises the target user's check-in activity;
         a second panel comprising a second selectable object corresponding to the grouped related actions of the news feed data associated with the activity related to the social graph of the target user, the news feed data comprising a link enabling a viewing user to participate in the activity of the target user;
      receive a selection of the first selectable object; and
      in response to the selection, display an expanded location data panel corresponding to the selectable object.

14. A method, comprising:
   receiving, at a computer system, a selection of a target user at a first user interface of a first application of a remote client device, the target user corresponding to a node in a social graph associated with a social-networking system and a contact in an address book, wherein the address book is an application supported by the remote client device and the selection of the target user comprises a gesture dragging the representation of the target user to a region of the user interface;

accessing one or more remote data stores for user-related information of the target user;

accessing one or more privacy policy databases for privacy settings of the target user;

determining whether the privacy settings allow the application to access the user-related information of the target user;

when the privacy settings allow the application to access to the user-related information of the target user, updating, in the address book, a stored location data for the contact with a location data of the target user;

determining that a first action and a second action are related actions of a news feed data associated with an activity related to a social graph of the target user by comparing one or more attributes of the second action with one or more attributes of the first action;

grouping the determined related actions of a news feed data associated with an activity related to a social graph of the target user;

sending the user-related information of the target user to the remote client device, causing the remote client device to display, in a second user interface of a second application at a client device, the user-related information in a frame overlaying the first user interface of the first application, the frame comprising a plurality of panels, wherein each of the panels includes a different subset of the user-related information, the plurality of panels comprising:

a first panel comprising a first selectable object corresponding to the location data of the target user, and wherein the location data comprises the target user's check-in activity;

a second panel comprising a second selectable object corresponding to the grouped related actions of the news feed data associated with the activity related to the social graph of the target user, the news feed data comprising a link enabling a viewing user to participate in the activity of the target user;

receiving a selection of the first selectable object; and in response to the selection, sending information to cause the remote client device to display an expanded location data panel corresponding to the selectable object.

15. The method of claim 14 wherein the accessing one or more remote data stores for user-related information of the target user is performed in accordance with one or more privacy settings configured by the target user.

16. The method of claim 14, wherein the expanded location data panel comprises a map corresponding to the location data of the target user.

\* \* \* \* \*